United States Patent [19]

Alaria et al.

[11] Patent Number: 4,555,782
[45] Date of Patent: Nov. 26, 1985

[54] BASE-BAND EQUIPMENT FOR GROUND STATIONS OF SATELLITE TELECOMMUNICATION SYSTEM

[75] Inventors: Gian B. Alaria, Turin; Silvano Appiano, Montafia d'Asti; Paolo Destefanis; Cesare Poggio, both of Turin, all of Italy

[73] Assignee: Cselt Centro Studi e Laboratori Telecomunicazioni SpA, Turin, Italy

[21] Appl. No.: 572,578

[22] Filed: Jan. 20, 1984

[30] Foreign Application Priority Data

Jan. 21, 1983 [IT] Italy .............................. 67069 A/83

[51] Int. Cl.$^4$ ............................................. H04J 3/06
[52] U.S. Cl. .................................................. 370/104
[58] Field of Search ...................... 370/104, 100, 110.1

[56] References Cited

U.S. PATENT DOCUMENTS

| | | | |
|---|---|---|---|
| 4,315,330 | 2/1982 | Brickman et al. | 370/104 |
| 4,319,352 | 3/1982 | Gupta et al. | 370/104 |
| 4,397,018 | 8/1983 | Fennel, Jr. et al. | 370/104 |

Primary Examiner—Douglas W. Olms
Assistant Examiner—Frank M. Scutch, III
Attorney, Agent, or Firm—Karl F. Ross; Herbert Dubno

[57] ABSTRACT

An SS/TDMA communication system comprises a multiplicity of ground stations, including one master station and a number of traffic stations without control function, exchanging digitized voice or other message signals via a relay station aboard a satellite. Each ground station comprises base-band equipment including a transmitting section, a receiving section and a control unit. The control unit of the master station generates outgoing timing signals and processes incoming timing signals for synchronizing the operations of its own equipment and that of the traffic stations with the operation of a switching unit of the satellite-borne relay station; this control unit also emits routing instructions for that switching unit. The transmitting section of each ground station is served by an independent time base while its receiving section has a time base locked to the clock of the satellite; both time bases are adjustable by the associated control unit for correlation with the timing signals sent to and received back from the relay station.

7 Claims, 8 Drawing Figures

BASE-BAND EQUIPMENT FOR GROUND STATIONS OF SATELLITE TELECOMMUNICATION SYSTEM

FIELD OF THE INVENTION

Our present invention relates to a system for exchanging digitized, pulse-code-modulated (PCM) message samples between ground stations, via a satellite-borne relay station, by the time-division multiple-access (TDMA) technique. More particularly, this invention pertains to base-band equipment utilized in the ground stations of such a system.

BACKGROUND OF THE INVENTION

In such a TDMA system the messages to be sent out arrive concurrently over local channels at a concentrating terminal associated with the transmitting ground station for sampling, digital coding and arrangement in time slots temporarily allocated to respective channels in a recurrent outgoing PCM frame, normally of 125 $\mu$s. Such a frame may have 32 time slots, two of them (e.g. the $1^{st}$ and the $17^{th}$) being reserved for synchronizing and supervisory signals including address codes identifying the destinations of the messages conveyed in the remaining 30 time slots. The digitized message sample in each active time slot is normally an 8-bit byte, corresponding a sampling rate of 64 kbit/sec. The overall bit rate of such a PCM frame is 2Mbit/sec.

The characteristics of TDMA terminals present at the ground stations designed for satellite links are internationally specified by the most important space authorities, such as Intelsat and Eutelsat.

It is well known that at a TDMA ground station a 2Mbit/sec PCM stream is to undergo various operations before being utilized to modulate the phase of the radio-frequency carrier used for transmission to the satellite. More particularly, sixteen data words in the form of 8-bit samples or bytes of each channel can be grouped together in orderly sequence. Within a given time interval of 2 ms, corresponding to a standardized TDMA frame period, the 128 bits of such a 16-byte sequence are converted to a higher speed and combined with the bits of other PCM streams by a multiplexing operation, thus yielding a standard outgoing TDMA frame of the same duration as the initial sequence.

A succession of such TDMA frames, e.g. 16 as described in commonly owned application Ser. No. 368,297 filed by one of us (Gian Battista Alaria) jointly with another on Apr. 14, 1982, can be grouped into a superframe in which the last TDMA period is dedicated to a synchronization code and other supervisory signals.

In a system of the SS/TDMA (satellite-switched time-division multiple-access) type the relay station aboard the satellite carries out switching functions in response to instructions received from the ground. A switching unit of such a relay station has been described, for example, in commonly owned U.S. Pat. No. 4,215,348.

As far as we are aware, precise specifications relating to SS/TDMA installations have not yet been internationally defined and no standards have been established for the on-board switching unit or for the equipment controlling same on the ground. The art shows an increasing tendency toward a combination of time-division and space-division switching stages requiring temporary storage of an entire TDMA frame; this is due to the fact that such switching units assure greater system efficiency in terms of traffic to be handled by a given structure. Such a combined temporal/spatial switching unit has been disclosed, for example, in commonly owned U.S. Pat. No. 4,386,425.

The circuitry needed for the routing of traffic with interim frame storage through a switching unit of, say, the TST (temporal/spatial/temporal) type is rather complex and can therefore not be installed aboard a satellite, at least with current technology. Existing ground stations, on the other hand, require modifications in order to accommodate the components necessary for remote routing control. Such modification, moreover, should take into account the desirability of minimizing the length of a TDMA frame in order to simplify the on-board memories serving for interim data storage. Furthermore, in a system in which several ground stations share a common up-link and down-link, the routing must be properly timed to coincide with transmission and reception windows assigned to a given ground station.

OBJECTS OF THE INVENTION

The general object of our present invention is to provide base-band equipment for the ground stations of a satellite communication system, with or without on-board switching, which is capable of properly synchronizing the transmitting and receiving operations of all these stations with one another and with the operation of the relay station aboard the associated satellite, taking into account changes in the position of the satellite relative to the earth.

A more particular object is to provide means in such equipment, especially for use in a system of the SS/TDMA type, operating with TDMA frames substantially shorter than those (of standardized 2-ms length) normally employed in systems without on-board switching.

SUMMARY OF THE INVENTION

In accordance with our present invention, the improved base-band equipment of a ground station comprises a transmitting section, a receiving section and a control unit, the transmitting section communicating with associated terrestrial sources (e.g. telephone exchanges) via a first bus provided with a multiplicity of conductors carrying parallel bits of data words to be sent out; the receiving section communicates with associated terrestrial destinations (which could also be telephone exchanges) via a second bus provided with a multiplicity of conductors carrying parallel bits of data words to be distributed. The transmitting section includes a first random-access frame memory having inputs connected to the first bus, a first random-access ancillary memory having inputs connected via a bidirectional internal but to the control unit, first timing means establishing alternate first writing and reading phases for the first frame memory and supplying writing addresses thereto, first parallel/series conversion means connected to certain conductors of the first bus for extracting service information from the outgoing bit stream and feeding such information to the control unit, first storage means readable by the first timing means for supplying reading addresses to the first frame memory during the first reading phases and to the first ancillary memory during certain of the first writing phases so as to enable this ancillary memory to be loaded by the control unit with extracted service information— through the internal bus—while the associated frame memory is being read, a parallel/series converter connecting outputs of both memories to a radio-frequency stage, and first series/parallel conversion means connected to certain conductors of the first bus for injecting service information from the control unit into the outgoing bit stream. Analogously, the receiving section includes a second random-access frame memory having outputs connected to the second bus, a second random-access ancillary memory having outputs connected via the internal bus to the control unit, second timing means controlled by synchronizing signals in the incoming bit stream for establishing alternate second writing and reading phases for the second frame memory and supplying reading addresses thereto, second parallel/series conversion means connected to certain conductors of the second bus for extracting service information from the incoming bit stream and feeding same to the control unit, second storage means readable by the second timing means for supplying writing addresses to the second frame memory during its writing phases and to the second ancillary memory during certain reading phases of the former whereby this ancillary memory is readable by the control unit through the internal bus while the associated frame memory is being written, a series/parallel converter connecting inputs of the second frame and ancillary memories to the radio-frequency stage, and second series/parallel conversion means connected to certain conductors of the second bus for injecting service information from the control unit into the incoming bit stream.

In order to insure proper coordination of the operations of the several ground stations with one another as well as with the satellite-borne relay station, we prefer to designate one of these ground stations as a master station including synchronizing circuitry in its control unit for correlating the outgoing TDMA frames with an operating cycle of the first timing means of this master station and emitting, in a dedicated phase of each outgoing TDMA frame, a synchronization code detectable by the control units of all other ground stations to adapt the operating cycles of their first timing means to that of the mster station.

In an SS/TDMA system, i.e. when the relay station includes temporal and/or spatial switching means for establishing temporary connections between channels of outgoing and incoming TDMA frames, routing instructions for the switching means are transmitted to the relay station—as part of the aforementioned service information—from the control unit of the master station by way of the associated up-link. This control unit, advantageously, includes a state memory which is loadable by a processor generating the routing instructions in order to store information on the distribution of the temporary connections established by the on-board switching means.

The first and second storage means of each ground station may be designed as memories of the electronically reprogrammable type whose contents can be modified from time to time by the associated control unit in order to change the readout sequence of the frame memories connected thereto. Such reconfiguration may take place in the presence of an enabling signal periodically emitted by the first timing means of the respective transmitting section in a phase of an outgoing TDMA frame during which data transmission is inhibited.

BRIEF DESCRIPTION OF THE DRAWING

The above and other features of our invention will now be described in detail with reference to the accompanying drawing in which.

SPECIFIC DESCRIPTION

Figure 1:
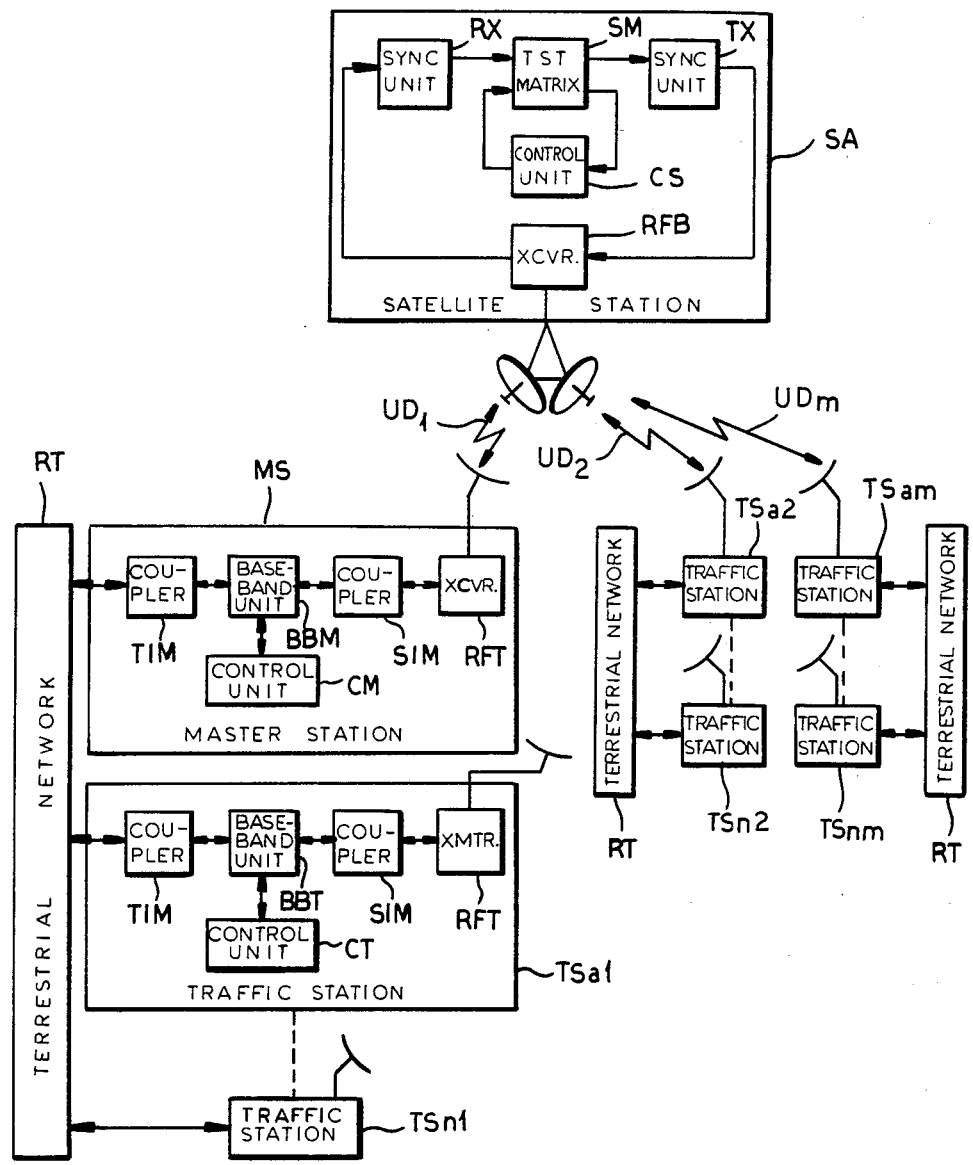
FIG. 1 is an overall block diagram of an SS/TDMA system including a multiplicity of ground stations with base-band equipment embodying our invention.

FIG. 1 shows, schematically, an SS/TDMA system wherein a multiplicity of ground stations communicate with one another through the intermediary of a satellite provided with a relay station SA, the ground stations constituting concentrating and deconcentrating PCM terminals for associated local lines of a terrestrial (e.g. telephone) network RT. These ground stations are divided, according to their geographic locations, into a number of groups; each station within a group has assigned to it a transmitting window in an outgoing TDMA frame and a receiving window in an incoming TDMA frame respectively beamed to and from the satellite in a common up-link and down-link symbolized by a double-headed arrow $UD_1$, $UD_2$, ... $UD_m$.

One of the ground stations shown in FIG. 1, designated MS, operates as a master station controlling the synchronization of all ground stations with one another and with the satellite station SA. The remaining stations, referred to hereinafter as traffic stations, have no controlling function and have been generally designated TS. Thus, the group using link $UD_1$ includes master station MS and traffic stations TSa1-TSn1; the groups using links $UD_2$ and $UD_m$ include traffic stations TSa2-TSn2 and TSam-TSnm, respectively.

Master station MS includes a base-band unit BBM co-operating with a control unit CM, a coupler TIM connecting unit BBM to the associated local lines of terrestrial network RT, and another coupler SIM connecting unit BBM to a radio-frequency stage RFT transmitting and receiving the two-way beam $UD_1$. Coupler TIM assembles the bytes of arriving PCM frames into outgoing TDMA frames and distributes the bytes of incoming TDMA frames to departing PCM frames; it also compensates aperiodic drifts, due to relative shifts between the clocks of the satellite and of the terrestrial network including the ground stations, as well as periodic shifts due to the Doppler effect. Coupler SIM modulates an up-link carrier with outgoing bytes and demodulates a down-link carrier for the recovery of incoming bytes.

Each traffic station, as particularly illustrated for station TSa1, has the same general structure as master station MS including couplers TIM and SIM as well as an r-f transceiver RFT; a base-bank unit BBT and a control unit CT thereof differ somewhat from their counterparts BBM and CM of station MS as more fully described hereinafter.

The satellite-borne relay statio SA comprises a transceiver RFB, corresponding to components RFT of the ground stations, synchronization units RX and TX for timing the processing of ascending and descending TDMA frames, an intervening switching unit SM including a TST matrix, and an associated control unit CS. The latter executes switching instructions generated by control unit CM of master station MS and received by station SA via the up-link portion of beam $UD_1$. Unit SM includes a memory for the temporary storage of ascending TDMA frames which, in the present instance, are preferably limited to a length of 500 μs corresponding to four 125-μs PCM frames. Thus, each TDMA channel or time slot accommodates four bytes (32 bits) constituting as many consecutive PCM samples of a voice or other message signal being transmitted.

The number of channels in a TDMA frame may be different for the several groups of ground stations, according to traffic density, thus giving rise to different bit rates. Within a given group, however, the bit rate must be the same. By way of example, a higher rate of nominally 131 Mbit/sec (more precisely 131.072 Mbit/sec) and a lower rate of 33 Mbit/sec (more precisely 32.768 Mbit/sec) may be used. With the higher rate, 2,048 PCM channels can be transmitted at 64 kbit/sec; with the lower rate, the number of PCM channels is reduced to 512.

Figure 2:
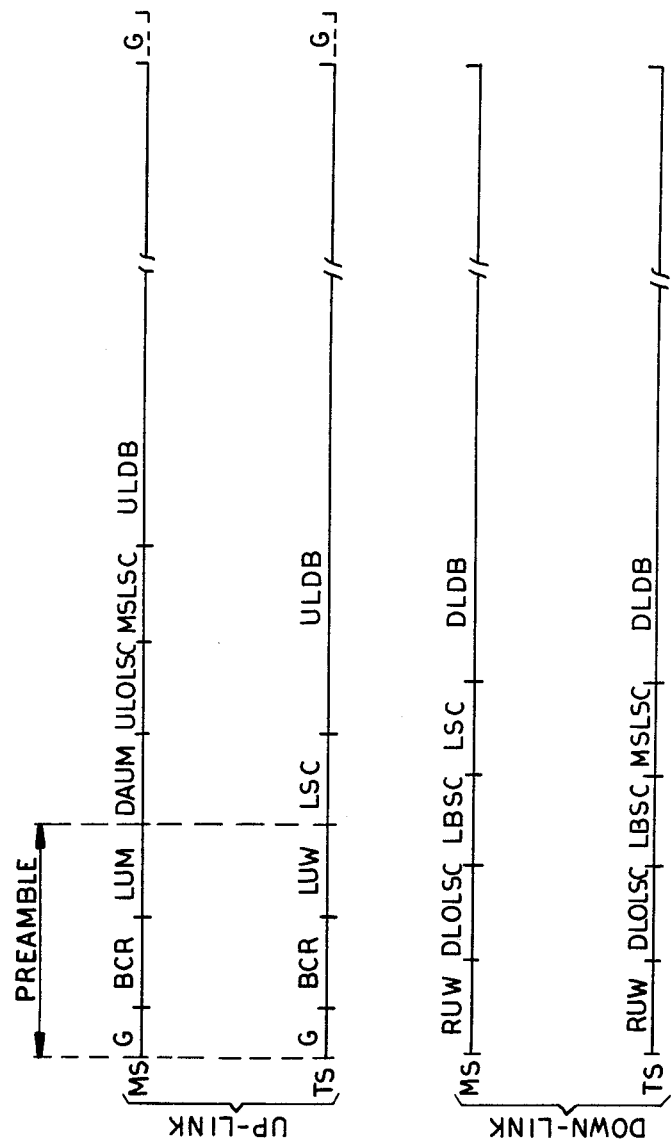
FIG. 2 shows the organization of outgoing and incoming TDMA frames transmitted and received by the ground stations of FIG. 1.

We shall now refer to FIG. 2 in which the two upper lines show the configuration of an ascending TDMA frame emitted on the associated up-links by master station MS and a traffic station TS while the two lower lines show the corresponding descending TDMA frames received by these stations via the associated down-links. The ascending frames on the up-links include preambles of predetermined length, not exceeding 512 bits, consisting of a guard interval G, a bit pattern or flag BCR (for "bit-carrier recovery") and a synchronism pattern LUW (for "local unique word") individual to the emitting station. If the frame shown in each of the two upper lines of FIG. 2 is divided into a number of transmission windows allotted to different ground stations, such as those indicated at MS, TSa1 in FIG. 1, the preamble will recur at the beginning of each window and will identify the respective station by the code LUW. The guard interval G is needed to allow for transients occurring upon the start of emission of a burst by a given station as well as for phase shifts due to satellite movements and to drifts of the clock signals.

The preamble is followed within each window by the remainder of the burst whose length may vary among the several stations and which, in the case of master station MS, is headed by a bit pattern DAUM (for "demand-assignment-updating message") representing the routing instructions for the switching unit of satellite station SA. This pattern is significant only for the initial setup of the on-board connections and whenever a modification of these connections is required. The next pattern, designated ULOLSC (for "up-link open-loop synchronization channel"), contains information regarding the distance—determined as described below—between the master station and the satellite. Bit patterns DAUM and ULOLSC, which are not generated by traffic stations TS, are followed in the transmission window of the master station by a pattern MSLSC (for "master-station line-signalization channel") containing instructons regarding the establishment or the release of a connection between that station and any traffic station. The outgoing data words, containing both service and message information, are indicated at ULDB (for "up-link data burst").

A traffic station TS, as seen in the second line of FIG. 2, emits the same preamble immediately followed by a pattern LSC corresponding to bit sequence MSLSC of the master station. The remainder of the window is occupied by the data burst ULDB.

A descending TDMA frame carried by a down-link does not require any guard interval or carrier-recovery time since the receiving sections of the ground stations have their time bases locked to that of the satellite. The latter generates, at the beginning of each descending frame, a code RUW (for "reference unique word") received by all ground stations, as is the following pattern DLOLSC which is the down-link return of the up-link pattern ULOLSC generated by the master station in its transmittion window. Each ground station further detects, at the beginning of its reception window, a pattern LBSC (for "loop-back synchronization channel") which is generated by the satellite at the instant of arrival of the beginning of a burst emitted by the respective ground station. The interval between the start of emission of the burst and the reception of code LBSC thus enables each ground station to calculate its current distance from that satellite, giving rise to the aforementioned code ULOLSC in the case of the mater station. There follows the line-signalization code LSC (exclusively in the case of reception by the master station) or MSLSC emitted by the originating station whose incoming date burst DLDB (corresponding to the outgoing data burst ULDB referred to above) is next. Thus, as seen in the two bottom lines of FIG. 2, the descending frames received by the master station and the traffic stations have essentially the same structure.

Figure 3:
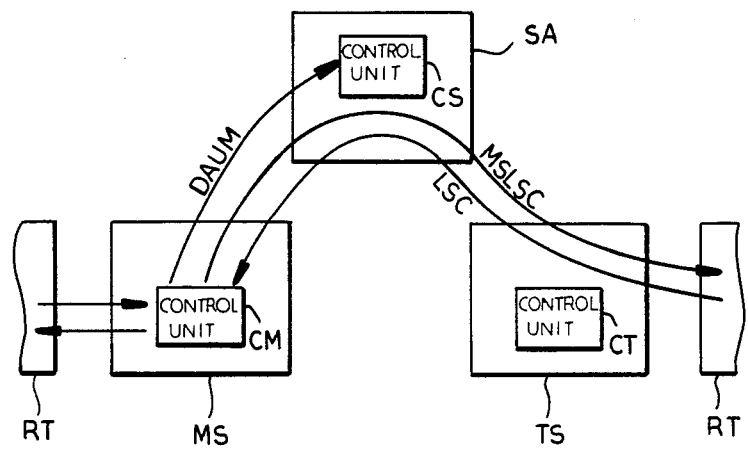
FIGS. 3 and 4 are diagrams illustrating the travel of synchronizing and control signals in the system of FIG. 1.
Figure 4:
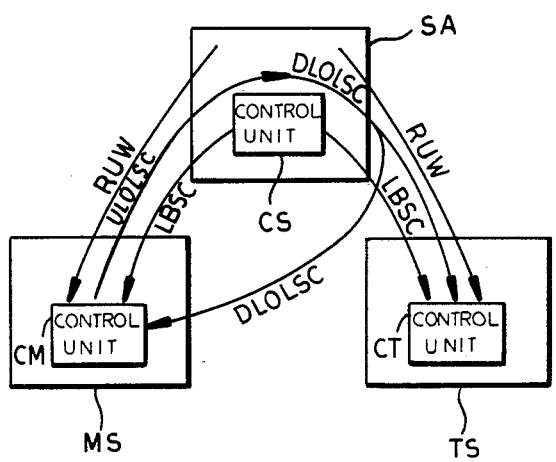

In FIGS. 3 and 4 we have shown, schematically, the transmission paths of the various codes (except those of the preamble) preceding the outgoing and incoming data bursts in FIG. 2. Thus, FIG. 3 indicates the passage of routing instructions DAUM from control unit CM of master station MS to control unit CS of satellite station SA, the unchanged transition of line signals MSLSC from unit CM via stations SA and TS to the destination of the associated data words in network RT, and the opposite transition of line signals LSC from a source in that network by way of stations TS and SA to unit CM as part of the service information taken into account by that unit for a possible route change. FIG. 4 illustrates the sending of reference word RUW and synchronizing word LBSC by the satellite to control units CM and CT as well as the emission of synchronizing word ULOLSC from unit CM to the satellite whence it returns as pattern DLOLSC to the control units of all ground stations.

Each of the various bit patterns or sequences described with reference to FIGS. 2–4 may occupy one or more 32-bit TDMA channels. The described organization of the frames, while preferred, could of course be altered in specific instances.

Figure 5:
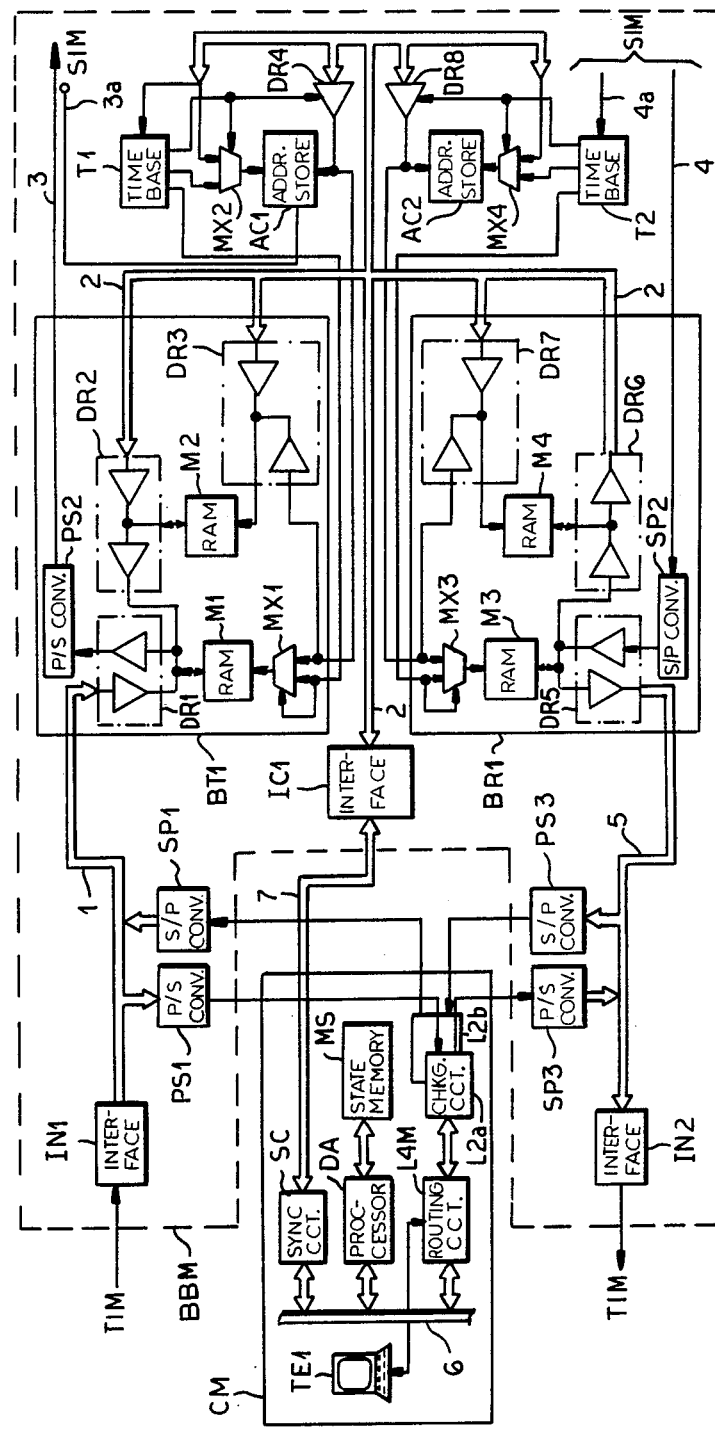
FIG. 5 is a more detailed block diagram of the base-band equipment of a master station included in the system of FIG. 1.

FIG. 5 shows details of the base-band equipment CM, BBM of master station MS.

Unit BBM is divided into two substantially identical sections, namely a transmitting section shown in the upper half and a receiving section shown in the lower half of the Figure. This division is necessary because the two sections are operated by different clock signals generated by respective time bases T1 and T2. The first time base T1, though shown included in unit BBM, is not necessarily part of station MS itself but could be located elsewhere in the part of network RT connected thereto. In any event, however, this time base is independent by adjustable by the control unit CM for the purpose of synchronization with the satellite as will be described with reference to FIG. 7. The second time base T2 is locked to the incoming bit carrier through the intermediary of a synchronization extractor responsive to the recurrent code RUW, located in the coupler SIM (FIG. 1) of the master station, to which it is connected by a lead 4a. Time base T2, whose operating cycles are shiftable by the Doppler effect in response to movements of the satellite, should also be adjustable by the control unit as described hereinafter with reference to FIG. 8.

Both sections of unit BBM are connected to unit CM through an interface IC1 inserted between a "synchronous" bidirectional bus 2 (carrying periodic signals) and an "asynchronous" bidirectional bus 7 (carrying aperiodic signals). Such interfaces are known per se; however, reference may be particularly made to the disclosure of a commonly owned application, Ser. No. 572,579 filed on even date herewith by three of us (Silvano Appiano, Paolo Destefanis and Cesare Poggio).

The transmission section is connected to the associated coupler TIM through an interface IN1 which receives from the terrestrial network RT (FIG. 1) service and message information having already been partly multiplexed by that coupler, e.g. to form a multiplicity of serial flows of 16 Mbit/sec containing the bytes of eight PCM frames, each such frame consisting of 256 bits arriving from a local line at a rate of 2 Mbit/sec. Each of these serial flows is transferred to a 256-wire multiple of an input bus 1 so as to form as many parallel flows of 64 kbit/sec. In the event that station MS is to send out an entire 500-$\mu$s TDMA frame, there will be eight such multiples connected to as many series/parallel converters inside interface IN1. Each multiple, accordingly, accommodates eight 32-bit TDMA channels, each of them containing four consecutive bytes of an arriving PCM channel or time slot.

Certain wires of input bus 1, carrying the bytes of a PCM channel allocated to line signalization coming from network RT, are connected to a parallel/series converter PS1 which forwards their bits to a component L2a of control unit CM more fully described hereinafter. Since that signalization (denoting line seizure, dialing, disconnection etc. in the case of a telephone network) may involve any of the traffic stations of the system served by the satellite, converter PS1 is divided into as many parts as there are traffic station. A similarly organized series/parallel converter SP1 injects the line-signal code MSLSC, based upon that information, into the appropriate conductors of bus 1; this code is obtained from a component L2b of unit CM. The illustrated components L2a and L2b are representative of respective groups thereof including one such component for each traffic station.

Input bus 1 terminates, within a transmitting buffer BT1, at a driver DR1 feeding the arriving bytes to a frame memory M1 of the random-access type which has a storage capactiy accommodating all the data words to be included in an outgoing TDMA frame, namely the bytes of 2048 PCM channels if station MS is assigned an entire TDMA frame with a rate of 131 Mbit/sec. The data present on bus 1 are sequentially written in memory M1 under the control of time base T1, which generates their writing addresses in a predetermined sequence, and are read out—generally in a different sequence depending on the frame configuration—under the control of another memory AC1 serving as an address store. Memory M1 is divided into two parts which are alternately written and read in respective phases established by time base T1 with the aid of a multiplexer MX1. Thus, respective halves of a channel period are allotted to writing and to reading, the read-out bytes being forwarded by driver DR1 to a parallel/series converter PS2 feeding them on a lead 3 to the associated coupler SIM shown in FIG. 1. Multiplexer MX1 alternately supplies the writing and reading addresses from time base T1 and from address store AC1 to memory M1.

An ancillary random-access memory M2, of substantially smaller storage capacity than memory M1, is loaded with service information pertaining to synchronization, specifically the preamble and the codes ULOLSC and DAUM described with reference to the first line of FIG. 2. This information is supplied to memory M2 from a synchronizing circuit SC of control unit CM via bus 7, interface ICL, bus 2 and a driver DR2 which also serves for the readout of the contents of memory M2 by way of driver DR1 to serializer PS2. Writing in this memory takes place in a reading phase of memory M1 in the presence of an enabling signal, supplied by time base T1 via a driver DR3, at addresses furnished by sync circuit SC through the same driver. Reading, at addresses supplied by memory AC1 through driver DR3, occurs while multiplexer MX1 is set for writing in memory ML.

If carrier modulation in coupler SIM is performed with 4-phase PSK (phase-shift keying) modalities, converter PS2 may comprise two elements respectively supplying in-phase and quadrature flow.

When memory M2 is to be read, the location of its reading address in memory AC1 is identified by an address supplied on internal bus 2 through a multiplexer MX2. This multiplexer normally allows memory AC1 to be so addressed but is periodically switchable by time base T1, in a predetermined phase of an outgoing TDMA frame, to permit a reconfiguration of the contents of the memory via bus 2 while memories M1 and M2 are both disabled from reading so that no data transmission on lead 3 can take place. The signal of time base T1 switching the multiplexer MX2 also unblocks a driver DR4 to let the new address information be loaded into memory AC1.

Memory or address store AC1 also has output lead 3a which may extend directly to r-f stage RFT for establishing the transmission window assigned to station MS in case this station shares the outgoing TDMA frames with one or more traffic stations as indicated in FIG. 1. It will be understood, however, that station MS—as well as, perhaps, some other ground station—could have an individual up/down beam assigned to it.

A control input of time base T1 is connected to a lead of internal bus 2 to enable its readjustment in response to signals from circuit SC of unit CM for the purpose of synchronization with satellite station SA. Such readjustment becomes necessary when unit CM determines, on the basis of the incoming code LBSC, that movements of the satellite have caused a shift resulting in an overlapping of bursts from different ground stations within a TDMA frame.

The receiving section of unit BBM, complementary to its transmitting section, comprises the following components which are the counterparts of those described above: an interface IN2 connecting an output bus 5 to coupler TIM, a series/parallel converter SP3 feeding service information from control-unit component L2a to certain conductors of that bus, a parallel/series converter PS3 extracting line-signal code LSC from conductors of that bus for delivery to control-unit component L2b, an address store AC2, and a receiving buffer BR1 encompassing a frame memory M3, an ancillary memory M4 and associated drivers DR5, DR6 and DR7. Converters SP3 and PS3 are subdivided in the manner described for their respective counterparts PS1 and SP1. A multiplexer MX3, switchable by time base T2, allows memory M3 to be alternately written and read at addresses respectively supplied by memory AC2 and time base T2. The bits of the incoming TDMA frame, appearing on an output lead 4 of coupler SIM, are serialized by a series/parallel converter SP2 which feeds them to driver DR5. Upon command of memory AC2, on the basis of the writing addresses stored therein, synchronizing codes DLOLSC and LBSC extracted from the incoming data flow are loaded via drivers DR5 and DR6 into memory M4 whereas the line code LSC is written into memory M3 for subsequent readout to bus 5 along with the message words forming part of data burst DLDB. Another multiplexer MX4, also switchable by time base T2, normally enables the reading of address from memory AC2 but allows a periodic modification of its contents with the aid of a driver DR8 in a manner analogous to that described for counterpart AC1. If necessary, memory AC2 may also establish a reception window in a manner corresponding to that described for the transmission window.

Components L2a and L2b of unit CM are designed to implement the functions of "Level 2" of CCITT Protocol N.7. Another component L4M implements the functions of "Level 4" of the same Protocol. The latter component is connected through an ancillary bus 6 to sync circuit SC and to a processor DA which dialogues with a state memory M5.

Components L2a and L2b, present in numbers sufficient to serve all traffic stations, process the signalizations MSLSC and LSC which are respectively sent to and received from these stations. This operation includes the introduction of protective bit combinations (redundancy codes) into the outgoing patterns and the verification of correctness on the basis of such combinations in the case of the incoming patterns. If the information extracted from buses 1 and 5 is found to be correct, it is forwarded to component L4M; otherwise, a retransmission request is emitted.

Component L4M evaluates the arriving signalization and supplies processor DA with the pertinent information; it also checks on the signalization generated by the processor for transmission to the several traffic stations.

A terminal TE1, connected to component L4M, enables an operator to introduce into unit BBM the information necessary for initialization or reconfiguration and to monitor the operation of the station.

Processor DA, utilizing the line signalization coming from component L4M and the information regarding existing connections which is stored in state memory M5, determines the routing instructions to be sent to control unit CS of relay station SA whenever the associated switching matrix SM requires reconfiguration. The processor concurrently updates the contents of memory M5. If a requested connection cannot be established, the processor informs the originating station of the existence of a busy condition. The routing instructions DAUM sent to unit CS are to be presented in a highly errorproof manner, e.g. with the well-known Golay code. The encoding is performed in sync circuit SC which also generates the synchronism patterns BCR, LUW and ULOLSC to be inserted into the outgoing TDMA frames. Circuit SC further detects the incoming synchronism patterns RUW, DLOLSC and LBSC to be utilized for adjustment of time base T1 and for other correlating operations as more fully described hereinafter with reference to FIG. 7.

Figure 6:
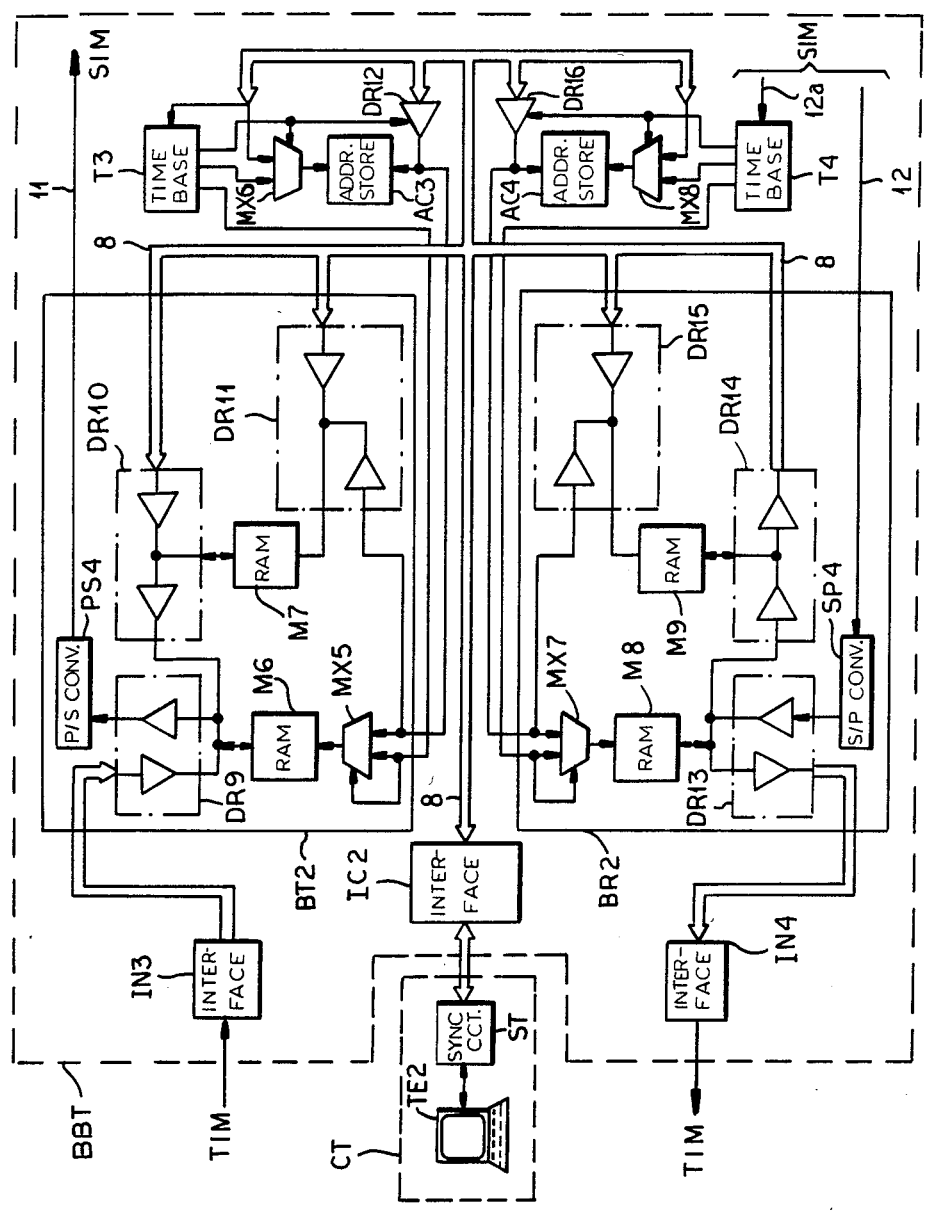
FIG. 6 is a similar block diagram pertaining to another station of FIG. 1.

FIG. 6 shows the base-band equipment of a representative traffic station TS, comprising units BBT and CT. Unit BBT, again divided into a transmitting section and a receiving section including respective buffers BT2 and BR2, differs from unit BBM of FIG. 5 by the absence of parallel/series and series/parallel converters PS1, PS3 and SP1, SP3. Thus, its transmitting section comprises an interface IN3 working through an input bus 9 into a driver DR9 which is in cascade with a driver DR10 and, together with a further driver DR11 and a multiplexer MX5, serves for the writing and reading of a frame memory M6 and an ancillary memory M7 under the control of an independent time base T3 and an address store AC3 which can be reloaded through the intermediary of a multiplexer MX6 and a driver DR12. The receiving section, analogously, comprises a frame memory M8 and an ancillary memory M9 with associated drivers DR13, DR14 and DR15, a time base T4 locked to the satellite clock via a sync extractor in the corresponding coupler SIM connected thereto by a lead 12a, an address store AC4 loadable by means of a multiplexer MX8 and a driver DR16, an output bus 10 and an interface IN4. Outgoing data words are delivered to coupler SIM through a parallel/series converter PS4 via a lead 11 while incoming words are received from that coupler on a lead 12 connected to a series/parallel converter SP4. Also shown in an output lead 11a of address store AC3 serving for the establishment of a transmission window.

Control unit CT, communicating with unit BBT through an interface IC2 and an internal bus 8, is much simpler than its counterpart CM of master station MS by comprising only a sync circuit ST connected on the one hand to interface IC2 and on the other hand to a terminal TE2.

If the traffic station operates with a transmission rate of 33 Mbit/sec, rather than 131 Mbit/sec as assumed for master station MS, the storage capacity of its memories can be correspondingly reduced. Thus, memories M6 and M8 need only accommodate a maximum of 512 PCM frames instead of the 2,048 frames referred to above.

Incoming signalization patterns LSC and MSLSC are transferred unchanged to ground network RT and satellite station SA, as discussed above with reference to FIG. 3, and are not handled by control unit CT.

In operation, the requisite data are initially loaded into memories AC1, AC2 of master station MS, and AC3, AC4 of all traffic stations TS by means of terminals TE1 and TE2. These data include frame structure, length of bursts, position with reference to the satellite and relationship of the input and output ports of switching matrix SM (FIG. 1) with the corresponding up-links and down-links. After the address memories have been suitably programmed, synchronism is to be acquired for the overall system as well as for each ground station as will now be described with reference to FIGS. 7 and 8.

The connections supplying clock pulses to the components of FIGS. 5 and 6 have been omitted for clarity's sake.

Figures 7, 8:
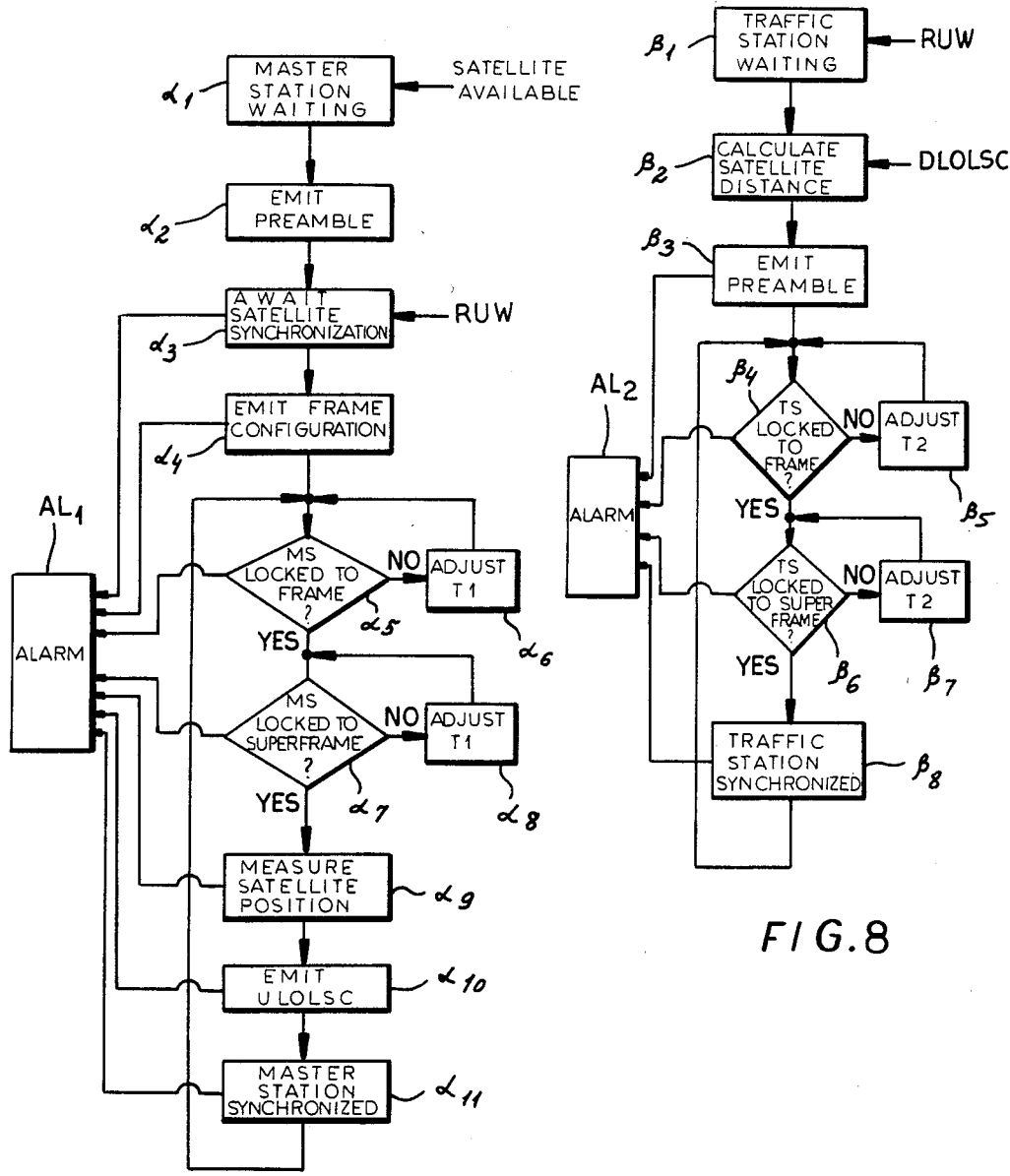
FIGS. 7 and 8 are flow charts relating to the operations of the two stations respectively represented by the block diagrams of FIGS. 5 and 6.

FIG. 7, which relates to the synchronization of master station MS, shows an initial waiting state $\alpha_1$ which is terminated when the satellite becomes available. Upon reception of a predetermined availability code by station MS, processor DA of its control unit CM passes to a step $\alpha_2$ with emission of the preamble shown in FIG. 2. In a step $\alpha_3$ the processor awaits the response of the satellite station, i.e. the arrival of code RUW, which causes a transition to the next step $\alpha_4$ that entails the transmission of information to the satellite regarding frame configuration (transmission and reception windows allocated to the several stations). There follows an inquiry $\alpha_5$ in which control unit CM checks whether its time base T1 is in step with the clock aboard the satellite; this is determined from the time of arrival of synchronization code LBSC. If the station is found not properly locked to the frame period, an adjustment of the time base is made in a step $\alpha_6$ whereupon inquiry $\alpha_5$ is repeated as many times as is necessary to achieve proper coordination. Thereafter, another inquiry $\alpha_7$ determines whether the station is also in step with a superframe of, say, 16 TDMA frames as dicussed above. This determination is made on the basis of the synchronization code present in the last TDMA period; cf the aforementioned application Ser. No. 368,297. A negative outcome of this inquiry leads to another adjustment step $\alpha_8$, again with as many repetitions as are necessary.

When synchronism is achieved, the distance of the satellite from the master station is calculated with the aid of code LBSC in a step $\alpha_9$ which is followed by a step $\alpha_{10}$ involving the emission of code ULOLSC. THe master station is then in an operative state as represented by a step $\alpha_{11}$.

FIG. 8 shows the corresponding synchronizing program for a traffic station TS. An initial waiting state, represented by a step $\beta_1$, is terminated by the arrival of code RUW at the beginning of an incoming TDMA frame. When the station next receives the code DLOLSC corresponding to code ULOLSC emitted by the master station in step $\alpha_{10}$, it calculates in a step $\beta_2$ its own distance from the satellite and advances to a step $\beta_3$ in which the preamble is being sent out. There follow two inquiries $\beta_4$, $\beta_6$ with intervening adjustment steps $\beta_5$ and $\beta_7$, if necessary; this constitutes an adjustment of the local time base T2 in a manner analogous with that described for steps $\alpha_5$–$\alpha_8$ of FIG. 7. When synchronism is achieved upon a positive outcome of inquiry $\beta_6$, the station assumes the operative state represented by a step $\beta_8$.

From steps $\alpha_3$–$\alpha_5$, $\alpha_7$ or $\alpha_9$–$\alpha_{11}$ the master station may activate an alarm $AL_1$ if a following step cannot be executed or some other irregularity is detected. In a similar manner, an alarm $AL_2$ can be activated by a traffic station from steps $\beta_3$, $\beta_4$, $\beta_6$ or $\beta_8$.

Let us now consider, in the steady state of all the stations represented by steps $\alpha_{11}$ and $\beta_8$ in FIGS. 7 and 8, the handling of a call originating by way of example at a subscriber connected to master station MS and destined for a subscriber connected to traffic station TSam of FIG. 1.

Unit BBM (FIG. 5) receives seizure and dialing signals on one of the arriving PCM channels which at the proper instants are extracted from bus 1 by converter PS1 and are supplied to component L2a which, upon verifying their correctness, forwards them to component L4M. The latter must now decide which up-link is involved in the call (in this instance the one assigned to the master station), which outgoing TDMA channel is available for transmission and which down-link is capable of extending the call to the receiving station (here TSam). These data are supplied to processor DA which thereupon starts a search for a suitable route.

Thus, the processor scans the channel-occupation map stored in state memory M5 to determine whether a free channel exists in the down-link assigned to station TSam. If no free channel is available, the processor directs component L4M to generate a busy signal sent via component L2a and converter SP3 to the originating exchange. If, however, the down-link assigned to station TSam contains such a free channel, the processor searches for a free path in matrix SM (again in light of the information stored in memory M5), causing a busy signal to be sent back to the exchange if this is not the case. Otherwise, the search continues to determine whether a return connection from station TSam to station MS can also be established via the corresponding links and matrix SM.

If two-way communication is possible, processor DA updates the contents of memory M5 and sends to component L4M the identity of the down-link channel; this information is inserted via component L2b and converter SP1 into the outgoing data flow on bus 1 and passes by way of memory M1 and serializer PS2 to stage RFT (FIG. 1) for transmission to the satellite. Another message concurrently generated by processor DA contains the routing instructions DAUM specifying the links and TDMA channels involved in the connection as well as the time slots during which matrix SM is to perform temporal switching. These instructions go to sync circuit SC which encodes them and delivers them through interface IC1 and bus 2 to the proper location in memory M2. Once the two-way connection through matrix SM has been established, data words ULDB and DLDB can be exchanged between the two stations. Message information contained in these data words is stored in frame memories M1, M8 for one direction of flow and in frame memories M6, M3 for the other flow direction; accompanying service or supervisory information is stored in ancillary memories M2, M9 or M7, M4, respectively.

A disconnect signal from the calling subscriber is extracted from bus 1 and fed via converter PS1 and component L2a to component L4M; if the called subscriber sends a disconnect signal, the same goes to component L4M via converter SP3 and component L2b. Component L4M ascertains from the disconnect signal the identity of the up-link and down-link channels involved in the call and supplies that information to processor DA which thereupon updates the contents of memory M5 so as to make these channels again available. The release is also communicated by component L4M to the originating exchange. No such communication, however, is sent to the on-board control unit CS whose state will be modified only by a new code DAUM requiring the establishment of another connection.

If the call had originated at an exchange connected to a traffic station TS, the procedure would have been the same except that the signalization to be processed by unit CM would have been extracted from the incoming data flow on bus 5 through converter PS3 and the component L2b associated with the calling station.

In the foregoing description it has been assumed that all communications have the same bandwidth and that each of them is allotted one channel in a TDMA frame. The disclosed system, however, also applies to a situation in which communications processed by the ground stations require a larger number of channels, e.g. for teletype or video transmissions (such as, for example, a video conference at 2 Mbit/sec). In such a case, of course, the route to be established will have to include as many TDMA channels (contiguous or not, depending on traffic conditions and switching possibilities) as are needed in each instance.

As will be readily apparent, no routing instructions DAUM will be emitted in a system without on-board switching. In a simple case, the control unit of the master station will have the same configuration as those of the traffic stations.

The allotment of channels to the various ground circuits need not be fixed but can be dynamically performed in dependence on the activity of any local line.

We claim:

1. In a time-division multiple access (TDMA) system for the exchange of digitized message samples between ground stations via a relay station aboard a communication satellite, each ground station transmitting data words from terrestrial sources in respective channels of outgoing TDMA frames via a radio-frequency up-link to said relay station for transfer to respective channels of incoming TDMA frames, each ground station receiving incoming TDMA frames via a radio-frequency down-link for distribution to terrestrial destinations, the improvement wherein each ground station is provided with base-band equipment comprising a transmitting section, a receiving section and a control unit, interconnected via a bidirectional internal bus said transmitting section communicating with associated terrestrial sources via a first bus provided with a multiplicity of conductors carrying parallel bits of data words to be sent out, said receiving section communicating with associated terrestrial destinations via a second bus provided with a multiplicity of conductors carrying parallel bits of data words to be distributed;

said transmitting section including a first random-access frame memory having inputs connected to said first bus, a first random-access ancillary memory having inputs connected via said bidirectional internal bus to said control unit, first parallel/series conversion means connected to certain conductors of said first bus for extracting service information from the outgoing bit stream and feeding such information to said control unit, timing means connected to said frame memory establishing alternate first writing and reading phases for said first frame memory and supplying writing addresses thereto first storage means connected to said first timing means, said bidirectional internal bus said first frame memory and said first ancillary memory said first storage means being said readable by said first timing means for supplying reading addresses to said first frame memory during said first reading phases and to said first ancillary memory during certain of said first writing phases, said first ancillary memory being loadable by said control unit with extracted service information during said first reading phases through said internal bus, said first frame and ancillary memories having outputs connected by way of a parallel/series converter to a radio-frequency stage, and first series/parallel conversion means connected to certain conductors of said first bus for injecting service information from said control unit into the outgoing bit stream;

said receiving section including a second random-access frame memory having outputs connected to said second bus, a second random-access ancillary memory having outputs connected via said internal bus to said control unit, second timing means connected to said second frame memory controlled by synchronizing signals in the incoming bit stream for establishing alternate second writing and reading phases for said second frame memory and supplying reading addresses thereto, said parallel/series conversion means connected to certain conductors of said second bus for extracting service information from the incoming bit stream and feeding such information to said control unit, second storage means, connected to said second timing means, said second frame memory and said second ancillary memory, said second storage means being readable by said second timing means for supplying writing addresses to said second frame memory during said second writing phases and to said second ancillary memory during certain of said second reading phases, said second ancillary memory being readable by said control unit through said internal bus during said second writing phases, said second frame and ancillary memories having inputs connected by way of a series/parallel converter to said radio-frequency stage, and second series/parallel conversion means connected to certain conductors of said second bus for injecting service information from said control unit into the incoming bit stream.

2. Equipment as defined in claim 1 wherein one of said ground stations is a master station including synchronizing circuitry in the control unit thereof for correlating said outgoing TDMA frames with an operating cycle of said first timing means of said master station and emitting, in a dedicated phase of each outgoing TDMA frame, a synchronization code detectable by the control units of all other ground stations to adapt the operatin cycles of their first timing means to that of said master station.

3. Equipment as defined in claim 2 wherein said relay station includes switching means responsive to routing instructions received from the control unit of said master station as part of said service information for establishing temporary connections between channels of outgoing and incoming TDMA frames.

4. Equipment as defined in claim 3 wherein the control unit of said master station includes a processor generating said routing instructions and a state memory connected to said processor for storing information on the distribution of the temporary connections established by said switching means.

5. Equipment as defined in claim 1 wherein each control unit includes terminal equipment connected to said bidirectional internal bus for introducing service information into said ancillary memories and storage means by way of said internal bus.

6. Equipment as defined in claim 1 wherein said first and second storage means are provided with normally blocked writing circuits responsive to periodic enabling signals from said control unit for facilitating a modification of their contents by said control unit.

7. Equipment as defined in claim 1 wherein said first storage means is operable by said first timing means to emit a signal establishing a transmission window during which data words stored in said first frame and ancillary memories can be sent out by said radio-frequency stage.

* * * * *